United States Patent [19]

Kulju

[11] Patent Number: 4,537,236
[45] Date of Patent: Aug. 27, 1985

[54] GRAB HARVESTER

[75] Inventor: Sakari Kulju, Pello, Finland

[73] Assignee: Valmet Oy, Finland

[21] Appl. No.: 561,992

[22] Filed: Dec. 16, 1983

[30] Foreign Application Priority Data

Dec. 21, 1982 [FI] Finland .................................. 824397

[51] Int. Cl.³ ............................................. A01G 23/08
[52] U.S. Cl. .................................... 144/336; 144/2 Z; 144/3 D; 144/34 R; 144/343
[58] Field of Search .................... 144/2 Z, 3 D, 34 R, 144/34 E, 33 S, 336, 338, 343

[56] References Cited

U.S. PATENT DOCUMENTS

| 3,461,928 | 8/1969  | Siiro         | 144/3 D |
| 3,542,099 | 11/1970 | Gibson        | 144/3 D |
| 3,735,786 | 5/1973  | Vit           | 144/2 Z |
| 3,797,539 | 3/1974  | Moser et al.  | 144/3 D |
| 3,797,541 | 3/1974  | Kurelek et al.| 144/3 D |
| 3,823,753 | 7/1974  | Moser         | 144/3 D |
| 4,083,463 | 4/1978  | Ericsson      | 144/3 D |

Primary Examiner—W. D. Bray
Attorney, Agent, or Firm—Steinberg & Raskin

[57] ABSTRACT

A grab-type tree harvester for processing trees comprises rotation means and a frame. The frame is connected to lifting means through the rotation means, in a manner such that the frame is adapted to rotate about a substantially vertical axis. The frame comprises grab means which are selectively moved by actuation means to an open or closed position, roller means for pulling a felled tree through said grab means, and at least one means for pruning the felled tree. The grab-type tree harvester is also provided with a jib that is pivoted on the frame and which, when a standing tree is being felled, is adapted to turn to a position substantially parallel to the tree being felled, by the aid of turning means. The jib is provided with means for gripping the standing tree, and also with sawing means for cross-cutting the standing tree.

8 Claims, 4 Drawing Figures

GRAB HARVESTER

BACKGROUND OF THE INVENTION

The present invention relates generally to tree harvesting, and more particularly to a grab-type tree harvester for processing trees.

Specifically, the present invention relates to a grab-type tree harvester for processing trees, the grab-type tree harvester comprising rotation means and a frame which is adapted to be connected through said rotation means to lifting means, in a manner so that the frame is adapted to rotate about a substantially vertical axis. The frame comprises grab means arranged to be selectively movable by actuation means into an open or closed position respectively, roller means for pulling the felled tree through said grab means, and at least one means for pruning the felled tree.

An example of a grab-type tree harvester is disclosed in Norwegian Patent No. 145,567, which is representative of the state of the art. The grab-type tree harvester of this reference is only suitable for processing trees which have already been felled.

SUMMARY OF THE INVENTION

Accordingly, it is an object of the present invention to provide a new and improved grab-type harvester apparatus for processing trees.

It is also an object of the present invention to provide a new and improved method for the grab-type harvesting of trees.

It is another object of the present invention to provide a new and improved grab-type harvester for processing trees which constitutes an improvement over conventional harvesters of the type such as disclosed in Norwegian Patent No. 145,567.

It is still another object of the present invention to provide a new and improved grab-type harvester for trees which has the capability of processing standing trees.

It is a further object of the present invention to provide a new and improved method for harvesting standing trees.

These and other objects of the invention are attained by providing a grab-type tree harvester which is principally characterized in that it is provided with a jib, pivotally linked to a frame of the harvester and disposed to be turnable by turning means, when felling a standing tree, to a position substantially parallel to the tree being felled. The jib is provided with gripping means for gripping the standing tree and with sawing means for cross-cutting the standing tree.

In one aspect, the present invention is directed to a grab-type tree harvester for trees comprising a frame, and rotation means mounted to the frame and to lifting means in a manner so that the frame is rotatable about a substantially vertical axis, grab means mounted on the frame for operatively engaging the tree and selectively movable between open and closed positions, actuator means for selectively opening and closing the grab means, roller means for operatively engaging and pulling the felled tree, and means for pruning the felled tree, in which the improvement comprises a jib pivotally mounted to the frame and adapted to be turned to a position substantially parallel to a standing tree to be felled, means for turning the jib to this position, means for gripping the standing tree to be felled, and saw means for cross-cutting the standing tree to fell the same.

In accordance with one aspect of the present invention, the jib, turning means, and gripping means all constitute means for guiding the tree in a directed manner after being cross-cut by the saw means, so that the tree falls in a desired direction. The turning means is also adapted to dispose the jib between a pair of grabs that constitutes the grab means of the tree harvester. The pruning means may comprise a spring-loaded pruning blade mounted on the jib. This spring-loaded pruning blade is disposed against a mechanical limit when the tree is being cut and guided to the felled position. This spring-loaded pruning blade is mounted to follow movement of the pair of grabs constituting the grab means, along the felled tree after the tree has been cut.

Additionally, a measuring roller is mounted on an upper end of the jib and is adapted to be actuated by the pruning blade, so that the measuring roller is urged against the tree trunk of the felled tree.

The present invention is also characterized by a method for harvesting a standing tree, which comprises disposing a jib substantially parallel to a trunk of the standing tree, with the jib pivotally mounted to a frame of a grab-type tree harvester, on which grab means and pruning means are also mounted. Gripping means mounted on the jib is actuated to grip the standing tree trunk and to press the same against saw means mounted on the jib. The saw means is then actuated to cross-cut the standing tree, which is then allowed to fall in a directed manner. Pruning of the tree takes place after the tree is felled.

The cross-cut tree is guided by the pivotal jib and gripping means to fall in a predetermined direction. After the tree is felled, at least one pruning blade is urged against the felled tree by moving the grab means affixed to the frame of the harvester and roller means for pulling the felled tree and engaged with the at least one pruning blade, against the tree. A second centermost blade affixed to the pivotal jib is urged against the felled tree under spring load, to remove any branches on the tree trunk if desired. The gradually decreasing dimensions of the tree may be continuously measured as the felled tree is being pruned, while said saw means may additionally be used to cross-cut the tree trunk of the tree after it is felled.

Numerous important advantages are attained with the grab-type tree harvester of the present invention. When a standing tree is being felled, only the jib on which the gripping and cross-cutting means have been mounted, need be turned to stand substantially parallel with the tree. Thus, for example, a feed mechanism of the grab-type tree harvester is freely suspended in a position determined by its center of gravity. In the grab-type tree harvester of the present invention, the pruning means may be attached to the turning jib, to the frame of the grab-type tree harvester, to the grabs constituting the grab means of the feed means, or to more than one of the previously-noted parts.

In operation of the grab-type tree harvester of the present invention, the tree is fixed to the turning jib throughout the felling operation. The tree is automatically guided as it falls, into a position in which it may be gripped directly by the feed means. The same cross-cutting saw means is used both in connection with felling the standing tree and cutting the felled tree into blocks during the pruning operation.

The centermost pruning blade of the grab-type tree harvester of the present invention, may be constructed so that during felling, it serves as a felling brace and as a guide determining the direction of felling. During the felling, this pruning blade lies against a mechanical limiter. When the tree is in pruning position after felling, this centermost pruning blade follows the motion of the pair of grabs constituting the grab means, so that the tree follows the center-line of the roller means. A following action of this kind may be accomplished by employing a linkage transmission or an hydraulic transmission. Moreover, the pruning blade has a built-in spring mechanism for following the shape of the tree being pruned.

BRIEF DESCRIPTION OF THE DRAWINGS

The invention is described in greater detail below, with reference to an exemplary embodiment thereof illustrated in the Figures of the accompanying drawings, but to which the invention is not intended to be exclusively limited. In the drawings.

DETAILED DESCRIPTION OF A PREFERRED EMBODIMENT

Figure 1:
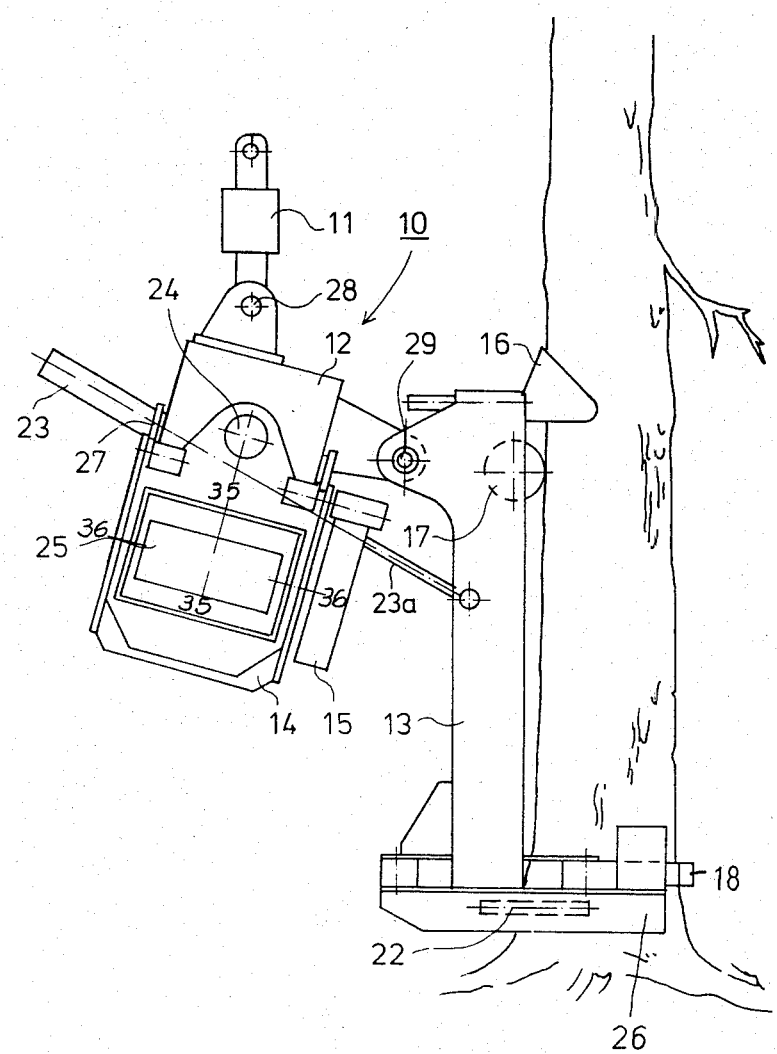
FIG. 1 illustrates a side elevational view of an advantageous embodiment of a grab-type tree harvester in accordance with the present invention, with the grab-type tree harvester in felling position.

The present invention will be described in greater detail with reference to FIGS. 1-4, in which like reference numerals designate identical or corresponding parts throughout the several views.

Referring to FIG. 1, the grab-type tree harvester of the present invention is generally indicated by reference numeral 10. Frame 12 of the grab-type tree harvester 10 is suspended and connected by rotation means 11, such as for example a rotatable member constituting a component of a lifting attachment of a forest tractor, with a pivotal arrangement, so that frame 12 is adapted to turn freely about a substantially vertical axis. Frame 12 comprises pivot means 28 for rotation means 11, pivot means for a pair of grabs 14 constituting grab means of the grab-type tree harvester, and pivot means 29 for a jib 13, these pivot means all being interconnected with each other by a plate structure. Each of the grabs 14 constituting the grab means are connected at pivot means to the frame 12 with journal pins, and to one another by an operating cylinder 24 and connecting rods 27. Lateral pruning blades 15 constituting pruning means and hydraulically operated pull rollers 25 constituting means for pulling a tree to be pruned through the grabs 14 of the grab means, are connected to the grabs 14.

Figure 3:
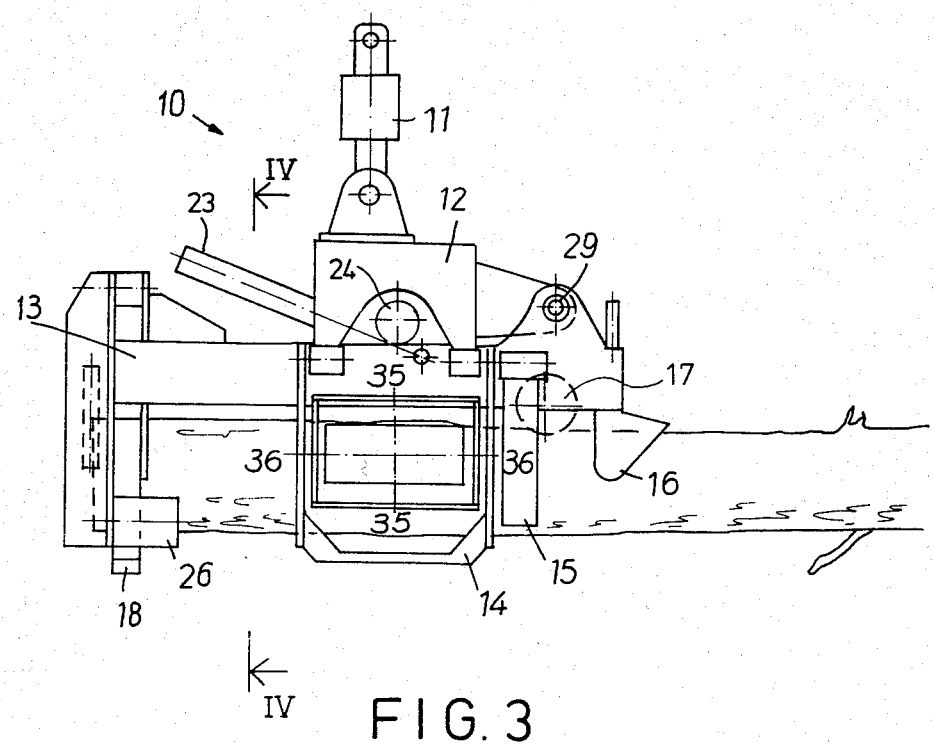
FIG. 3 illustrates a side elevational view of the grab-type tree harvester of FIG. 1, in which the grab-type tree harvester is in pruning position.

Operating cylinder 24 of the pair of grabs 14 moves one of the two grabs, whereupon motion is transmitted by connecting rods 27 to the other grab. The jib 13 is mounted through pivot means 29 to frame 12, so as to be movable under the action of a cylinder 23 (through piston rod 23a engaged with the jib 13, as illustrated in FIG. 1) from the standing or felling position (FIG. 1) to a felled position between the grabs 14 (FIG. 3). When the jib 13 is in the latter position, i.e. between the grabs 14, the grabs 14 can move freely between the open and closed positions.

Figure 4:
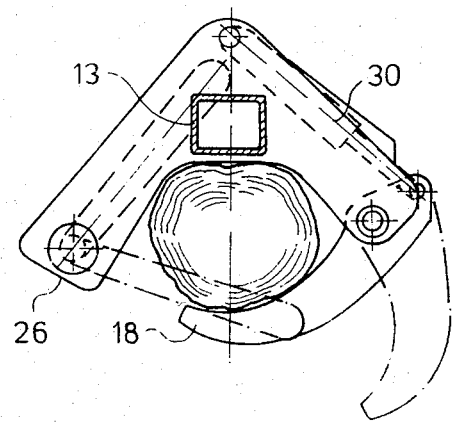
FIG. 4 illustrates a sectional view along line IV-IV of FIG. 3.

At the upper end of the jib 13, a spring-loaded pruning blade 16 is provided, constituting part of the pruning means, which, when the jib is in the pruning position, is moved upwardly and downwardly by the connecting rods 27 of the grabs 14 with the aid of levers as is conventional, so that when the grabs 14 are closed, the centermost blade 16 is in its lowest position, and when the grabs 14 are open, the centermost blade 16, being spring-loaded, is elevated. Gripping means comprising grabs 18 and sawing means 26 are mounted on a lower part of the jib 13. Grabs 18, part of the gripping means, are operated by an hydraulic cylinder 30 and pivoted on the plate structure of the lower end of jib 13, the lower end of jib 13 serving as the frame and attachment plane for the sawing means 26 and the gripping means comprising the grabs 18. Grabs 18 and sawing means 26 are disposed on a front side of jib 13, on respective sides thereof (FIG. 4). Sawing means 26 comprises drive motor 19 mounted on the top of the frame plate of jib 13 and a blade turning apparatus situated beneath the motor 19, the turning apparatus including support bearings 21 and a turning cylinder 22.

A measuring roller 17, provided on its periphery with spikes (not shown), is mounted on the top end of the jib 13 and serves as a tree length measuring means. Roller 17 is put in motion by centermost blade 16, so that roller 17 lies against the tree under the urging of a spring. The grab-type tree harvester of the present invention is provided with an hydraulic system for operating its various components. The hydraulic system is operated by a suitable control system. In the preferred embodiment, the hydraulic system of the grab-type tree processor 10 of the present invention, is arranged as follows:

Pressurized oil is conducted from a suitable external source, such as the hydraulic system of a forest tractor, to a point above rotation means 11 along pipes attached to a jib of a supporting crane, the pressure being carried therefrom by flexible tubes to a valve assembly attached to frame 12 of the grab-tree harvester, and following the jib 13, by pipes to a valve of the grabs 18 of the gripping means, situated at the lower end of jib 13. An electrically-controlled valve distributes pressurized oil to rotation means 11, roll means 25 for pulling the felled tree, drive motor 19 of the saw means, and to cylinder 22.

The pressure is conducted to the drive cylinder 24 of the grabs 14 through rotation means 11, along bores provided therein. Pull rollers 25 which constitute the roller means and which are situated on the grabs 14, are driven by hydraulic motors (not shown) accommodated inside the pull rollers 25 themselves. Supporting frames for the pull rollers 25 are pivoted to side plates of the grabs 14. The control system of the grab-type tree harvester of the invention is arranged with the hydraulic valves being electrically controlled through manual controls in the cab of the machine such as the crane (not illustrated), or through a programmed apparatus such as a computer. For controlling the measuring apparatus, i.e. the measuring roller 17, a program apparatus is used in the cab of a crane or the support, which in turn controls the pull rollers 25.

Figure 2:
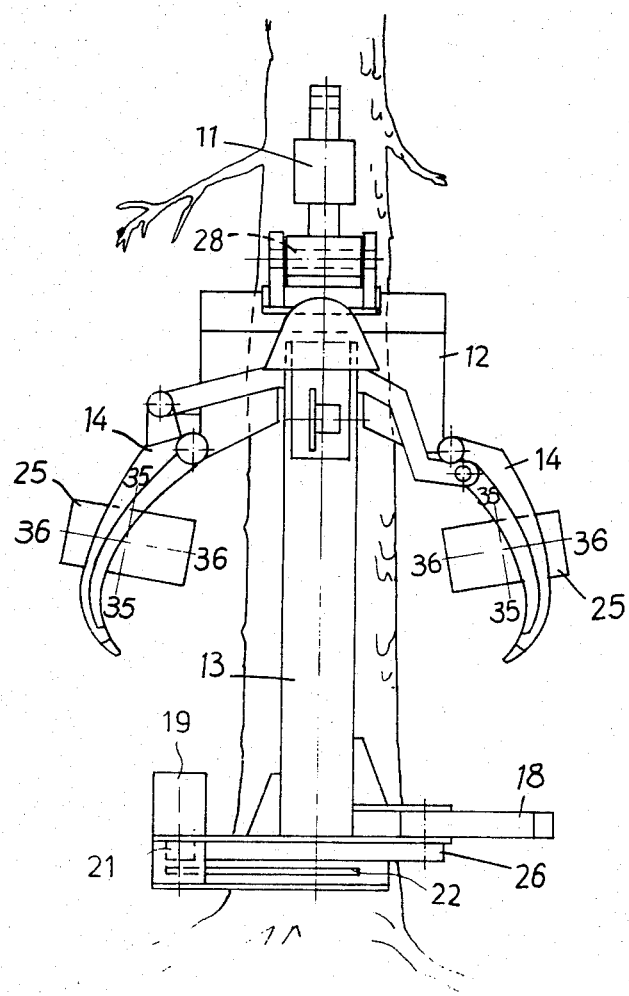
FIG. 2 illustrates a rear elevational view of the grab-type tree harvester of FIG. 1.

The grab-type tree harvester of the present invention is operated in the following manner. The harvester initially operates to fell a standing tree (felling of a standing tree proceeds as follows). Thus, the grab-type tree harvester 10 is conveyed, guided by a jib of a support crane, onto the trunk of the tree to be felled, with the jib 13 turned into its upright position and with the gripping grab 18 constituting the gripping means so opened that the standing tree enters between the gripping grabs 18 and the sawing means 26, as illustrated in FIG. 2. The gripping grab 18 is used to press the tree against sawing means 26, with the jib 13 resting against the tree trunk by the guide chute of the lower portion of the jib 13 and also by the portion of the jib 13 adjacent pruning blade 16.

The tree can be made to fall in the desired direction when sawing takes place, by the crane lifting somewhat at the end of the sawing phase, and with the felling cylinder 23 assisting. When the tree falls, while fixed to the jib 13 by the gripping grab 18, jib 13 turns to its top position from between the grabs 14, and the felling cylinder 23 secures jib 13 to the frame 12. Thereafter, the grabs 14 are used to urge the pull rollers 25 that are attached thereto against the tree trunk, and the gripping grabs 18 are detached from the tree.

Pruning of the felled tree proceeds as follows. As the grabs 14 and the pull rollers 25 attached thereto move against the felled tree trunk, pruning blades 15 which are affixed to the grabs 14 with a spring loading, are also urged against the tree. In like manner, as the grabs 14 move along the felled tree trunk, the centermost blade 16 moves under spring loading against the felled tree. Pulled by the pull rollers 25 (each pull roller 25 has an axis of rotation 35—35 and an axis of symmetry 36—36 perpendicular to the axis of rotation 35—35), the felled tree is forced to pass by blades 15 and 16, whereby the blades cut the branches off the felled tree. As the centermost blade 16 presses against the felled tree, measuring roller 17 of the measuring apparatus also moves under a spring loading to press against the tree trunk, at a point where the centermost blade 16 has removed the branches.

As the diameter of the tree becomes smaller as it is pruned, grabs 14 move to reduce the inter-grab dimensions, whereby pruning blades 15 and 16 also move accordingly in the direction of a reducing tree diameter. The motion of the grabs 14 is also followed by the pull rollers 25, which, with the aid of the pivoted frame 12, conform to the configuration of the felled tree trunk. A pulse transmitter rotating together with the measuring roller 17, supplies data to the programming apparatus for the measuring sequence, concerning the progress of the tree as it passes between the grabs 14.

The cutting of the felled tree to desired lengths proceeds as follows. When the pull rollers 25, which are electrically controlled by the measuring apparatus, stop, sawing means 26 executes the cross-cutting of the tree. Pressurized oil, conducted under control by a valve to the drive motor 19 of the sawing means, rotates the blade of the sawing means. The pressurized oil, conducted from the return flow of the motor 19, is carried to the blade-turning cylinder 22, which then begins to turn a blade flange, and the sawing takes place. On completion of sawing, the electrically-control valve reverses the flow of pressurized oil, and the cylinder 22 returns the blade flange to its initial position. During the rotation phase of the blade, lubricating oil is supplied to it through an adjustable needle valve and a check valve. Operation of the pull rollers 25 may once again follow, for the purpose of pruning the tree.

Handling of a tree already felled proceeds as follows. When a tree is already felled, it is picked up from the ground with the grabs 14, the jib 13, and pulled by the felling cylinder 23 in its upper position and by grabs 18 of the gripping means in the open position. When the grabs 14 lift the tree against the pruning blades 15 and 16, and when the tree enters between the pull rollers 25, the pruning sequence may begin. Pruning and cross-cutting concomitantly take place in like manner as described above, concerning the processing of a standing tree.

In the foregoing, one advantageous embodiment of the invention has been described, and it is easily comprehensible to a person skilled in the art that numerous modifications thereof can be made within the scope of the present invention.

What is claimed is:

1. In a grab-type tree harvester for processing trees, including
   a frame;
   rotation means mounted to said frame and adapted to be connected to lifting means, for rotating said frame about a substantially vertical axis;
   grab means mounted on said frame for operatively engaging a tree to be processed, said grab means being selectively movable between open and closed positions;
   actuating means for selectively opening and closing said grab means;
   roller means for operatively engaging and pulling a felled tree being processed through said grab means; and
   pruning means for operatively engaging and removing branches from the felled tree being processed as it moves through said grab means;
   the improvement comprising:
   a jib pivotally mounted to said frame and adapted to be turned with respect to said frame, said pruning means, and said grab means to a position substantially parallel to a standing tree to be felled;
   means for turning said jib with respect to said frame, said pruning means, and said grab means to said position substantially parallel to the standing tree to be felled;
   means mounted on said jib for gripping the standing tree to be felled; and
   saw means mounted on said jib for cross-cutting the standing tree to fell the same.

2. The combination of claim 1 wherein said jib, turning means, and gripping means constitute means for guiding the tree in a directed manner after being cross-cut by said saw means, so that the tree falls in a desired direction.

3. The combination of claim 2 wherein said roller means are mounted on said grab means, and
   wherein said turning means causes the cross-cut tree gripped by said gripping means to fall in the desired direction to the felled position,
   said grab means, roller means, and pruning means being situated to be operatively engageable with the tree in the felled position.

4. The combination of claim 3 wherein said grab means include at least one pair of grab members situated in mutually opposed relationship and movable between open and closed positions,
   wherein when said guide means directs the cut tree to fall in the desired direction to the felled position, said jib is situated between said opposed grab members.

5. Method for harvesting a standing tree, comprising the steps of disposing a jib substantially parallel to a trunk of the standing tree, the jib being pivotally mounted to a frame on which grab means and pruning means are mounted, actuating gripping means mounted on said jib to grip the standing tree and to press the same against saw means, actuating said saw means mounted on said jib and pressing against the tree trunk, to cross-cut the standing tree, and guiding the cross-cut tree to fall in a directed manner by turning only said jib with respect to said frame, said pruning means, and said grab means, to a felled position where said grab means and pruning means operatively engage the same.

6. The method of claim 4 comprising the additional step of pruning the tree after the tree is felled.

7. The method of claim 5 wherein the cross-cut tree is guided by said pivotal jib and said gripping means to fall in a predetermined direction.

8. The combination of claim 1, wherein said turning means comprises a cylinder, a cylinder rod movably disposed within said cylinder and engaging said jib, and pivot means pivotally engaging said jib with said frame.

* * * * *